3,664,713
SKID CONTROL SYSTEM UTILIZING VEHICLE DECELERATION

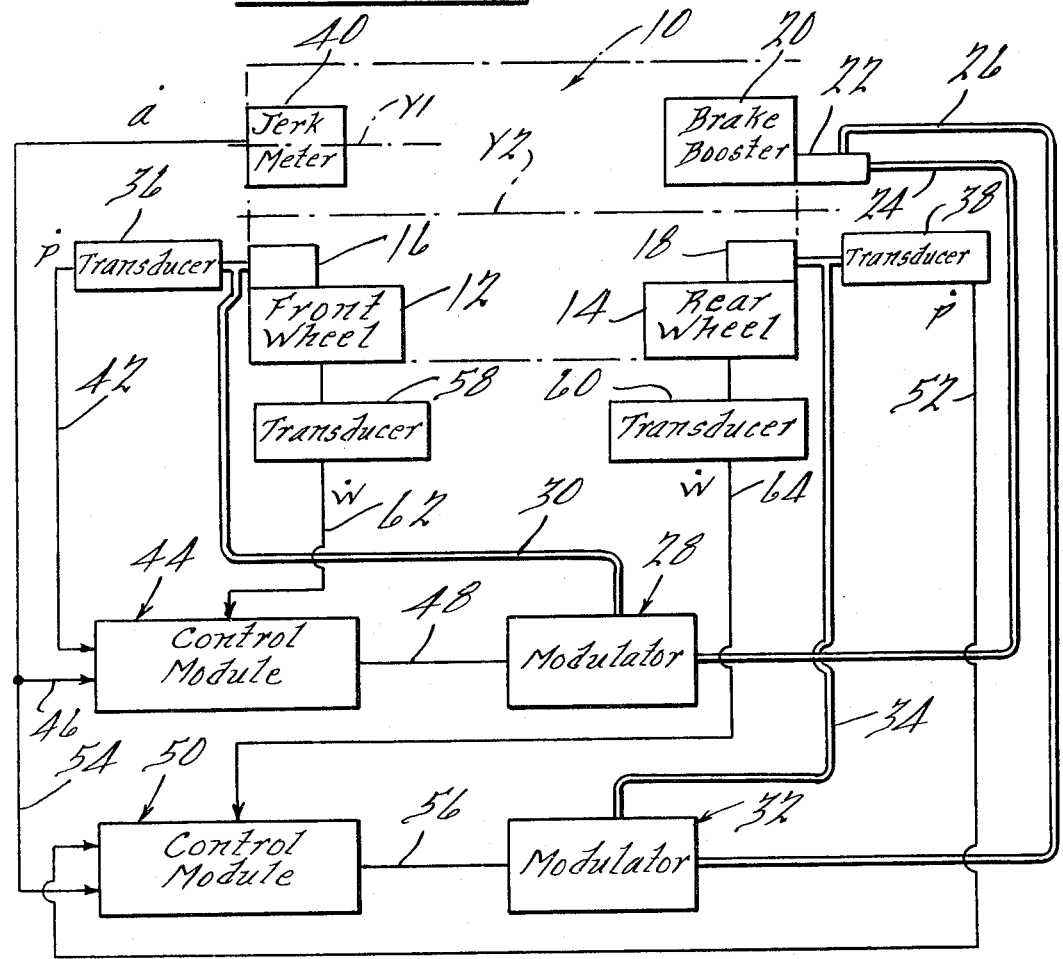
Fig. 1.
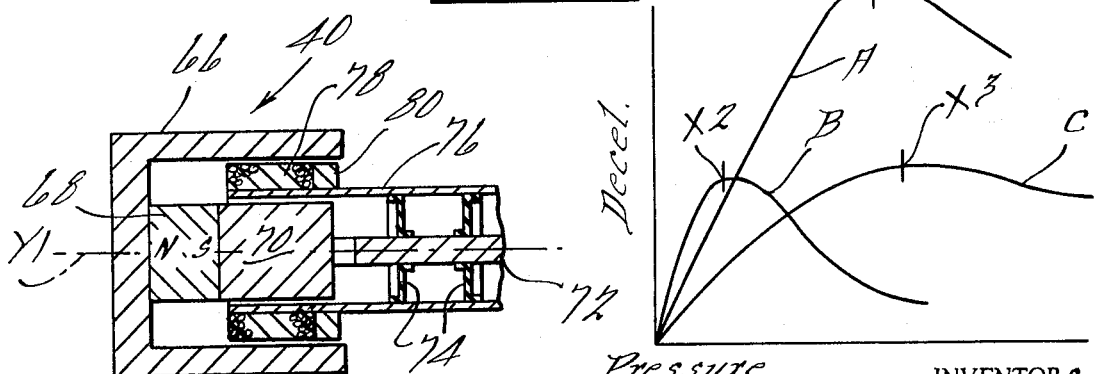
Fig. 2.
Fig. 3.
INVENTORS.
Hugh E. Riordan
Frank L. Moncher
BY
Harness, Dickey & Pierce
ATTORNEYS.

Hugh E. Riordan, Ann Arbor, and Frank L. Moncher, Farmington, Mich., assignors to Kelsey-Hayes Company, Romulus, Mich.
Filed Sept. 25, 1969, Ser. No. 860,960
Int. Cl. B60t 8/12
U.S. Cl. 303—21 P  6 Claims

ABSTRACT OF THE DISCLOSURE

A skid control system for a wheeled vehicle utilizing vehicle deceleration to control brake pressure and including apparatus for measuring the rate of change of vehicle deceleration.

SUMMARY BACKGROUND OF THE INVENTION

The present invention relates to skid control systems.

In the relationship between the deceleration of a wheeled vehicle and the magnitude of pressure in the brakes of the wheels of the vehicle, a curve is defined having a maximum value at some pressure indicating maximum deceleration. The rate of change of vehicle deceleration at the maximum point is zero. Thus by measuring the rate of change of vehicle deceleration, and further by monitoring the change of brake pressure, the maximum point can be determined and the fluid pressure to the brakes can be modulated such as to maintain the vehicle at maximum deceleration. Therefore, it is an object of the present invention to provide a skid control system maximizing the deceleration rate of the vehicle by determining the rate of change of vehicle deceleration. It is another object to provide a system of the latter type in which the pressure to the brakes of the vehicle will be modulated in accordance with the rate of change of vehicle deceleration. It is still another object of the present invention to provide apparatus for determining the rate of change of vehicle deceleration. It is another general object of the present invention to provide a novel skid control system.

Other objects, features, and advantages of the present invention will become apparent from the subsequent description and the appended claims taken in conjunction with the accompanying drawings.

BRIEF DESCRIPTION OF THE DRAWINGS

FIG. 1 is a general block diagram of the system embodying features of the present invention;

FIG. 2 is a graph showing the relationship between vehicle deceleration and brake pressure; and FIG. 3 is a sectional view of a device for providing an indication of the rate of change of vehicle deceleration.

Looking now to FIG. 2 the graph depicts the relationship between vehicle deceleration and brake pressure. Curves A, B, and C are typical curves occurring under different braking conditions, i.e. different mu surfaces, etc. It can be seen in the graph of FIG. 2 that all three curves have a maximum point, X1, X2, X3 which will occur when the derivative of the vehicle deceleration is zero. In the system of the present invention vehicle deceleration is measured and its rate of change is determined and the brake pressure is modulated to maintain the vehicle at the point X, regardless of the environmental conditions of the vehicle as defined by the different curves, i.e. A, B, C.

The system will be described in conjunction with the curve A, it being understood that the description will similarly apply to curves B and C. During initial application of brake pressure vehicle deceleration will be rising and the rate of change of deceleration on the forward part of the curve A (up to the point preceding the point X1) will be positive. At this period of operation the brake pressure is increasing, i.e. rate of change of pressure is positive, and this indicates that no control action need be taken and that brake pressure should be permitted to increase. With further increase in pressure, the point of operation on curve A will cross over the point X1 onto the trailing portion of the curve; at this time the rate of change of vehicle deceleration is negative; since the brake pressure is still being increased its rate of change will still be positive. Under these conditions it can be seen that brake pressure is now excessive and that the pressure should be relieved or reduced. As pressure is reduced vehicle deceleration will now proceed back up the trailing portion of the curve A towards the point X1. In this condition, the rate of change of deceleration is positive while the rate of change of pressure is negative. Since deceleration is increasing, the brake pressure should be continued to be decreased. As the point X1 is again crossed and the vehicle is again operating on the forward part of the curve A, it can be seen that the vehicle deceleration is beginning to decrease and hence its rate of change is negative; at the same time the pressure to the brakes is still being decreased and its rate of change is negative. In this condition the brake pressure should be increased. The above relationships and the necessary action have been set forth in the following table:

| When | $\dot{a}$ | $\dot{P}$ | $\dot{a}/\dot{P}$ | action to be taken |
|---|---|---|---|---|
| | + | + | + | pressure increased |
| | − | + | − | pressure relief |
| | + | − | − | pressure relief |
| | − | − | + | pressure increased |

In the table it can be seen that when the ratio of rate of change of acceleration over rate of change of pressure has a positive sign, i.e. $\dot{a}$ and $\dot{P}$ are of the same sign, the pressure should be increased and that when the ratio has a negative sign, i.e. $\dot{a}$ and $\dot{P}$ are of different signs, the pressure should be relieved.

A system operating in the manner described above is shown in FIG. 1 in which an automotive vehicle is generally indicated by the numeral 10 and includes at least one front wheel 12 and a rear wheel 14 having brake wheel cylinders 16 and 18, respectively. The pressure to the wheel cylinders 16 and 18 is provided by a conventional brake booster 20 through a conventional dual master cylinder 2 which has output lines 24 and 26. The line 24 is hydraulically connected to the wheel cylinder 16 through a pressure modulating device 28 and fluid line 30 while the line 26 is connected to the rear wheels cylinder 18 via a pressure modulator 32 and fluid line 34. In its simplest form the modulators 28 and 32 can be simply on-off devices which when turned "on" are actuated to block master cylinder pressure from the respective wheel cylinders while opening up a fluid chamber to the wheel cylinders thereby decreasing pressure to the brakes and when turned "off" they are actuated to return towards the original magnitude of applied fluid pressure resulting in an increase in pressure to the wheel cylinders. Such a modulating device can be the type as that shown in the copending patent application of Every et al., Ser. No. 842,825, filed July 10, 1969, now Pat. No. 3,515,440 the details of that application are incorporated herein by reference. A pressure transducer 36 is connected to the fluid line 30 to the front wheel brakes and provides an output signal P which is indicative of the rate of change of fluid pressure to the wheel cylinder 16. In a similar manner pressure transducer 38 is connected to the fluid line 34 to the rear wheel cylinder 18 and provides an output signal P indicative of the rate of change of pressure to the rear brakes. Vehicle 10 has a jerk meter 40 mounted thereon which is constructed to provide an output signal indicative of the rate of change of vehicle deceleration ($\ddot{a}$). The rate of change of pressure signal $\dot{P}$ from transducer 36 is transmitted via conductor 42 to a first control module 44 which also receives the rate of change of deceleration signal $\dot{a}$ from the jerk meter 40 via conductor 46. The control module 44 will then divide the $\dot{P}$ signal and the $\dot{a}$ signal and if the resultant sign is negative, will provide an output signal to the modulator 28 via conductor 48 to actuate the modulator 28 to its "on," condition. In the "on" condition, the modulator 28 will reduce the brake pressure in the line 30 and hence to the front wheel cylinder 16. When this sign changes to positive, the signal at conductor 48 will be discontinued and modulator 28 will be actuated to its "off" condition to return towards its original condition resulting in an increase in pressure to the wheel cylinder 16. The brakes of the rear wheel 14 are controlled in a similar manner.

Hence, the output signal $\dot{P}$ from the transducer 38 is transmitted to the module 50 via a conductor 52 which also receives the rate of change of deceleration signal $\dot{a}$ via conductor 54. Again the module 50 performs the necessary division to provide an output signal at the conductor 56 to modulator 32 when the sign is negative and to remove the signal at conductor 56 when the sign is positive. The above actuation and control will prevent the wheels from locking up and hence, prevent skidding.

Note that the system is normally inoperative during the initial portion of normal application of brake pressure; hence, the vehicle operator can apply or relieve brake pressure with no effect from either modulator 28 or 32. Note in this regard that the modulators 28 and 32 are incapable of increasing pressure beyond that which is applied by the vehicle operator. Hence, during the operation along the leading or initial portions of the curve A, for example, the sign of the ratio of $\dot{a}$ to $\dot{P}$ will always be positive indicating that further pressure can be accommodated; in this condition, however, no signal is transmitted to the modulators 28 and 32 and then will remain "off" and hence, operation will be strictly in control of the vehicle operator.

In order to assure that vehicle brakes will not be relieved inadvertently at low wheel decelerations, it may be desirable to disable the modules 44 and 50 until a preselected magnitude of wheel deceleration has been attained. This can be done by the use of speed transducers 58 and 60. Transducers 58 is connected to the front wheel 12 senses its speed and transmits the derivative $\dot{W}$ to the module 44 via conductor 62; transducer 60 senses the speed of the rear wheel 14 and transmits the derivative $\dot{W}$ to the module 50 via conductor 64. The signals $\dot{W}$ are indicative of the decelerations of the associated wheels (12, 14); unless these signals have a preselected magnitude modules 44 and 50 cannot be actuated regardless of the other information received, i.e. signs of $\dot{a}$ and $\dot{P}$.

The details of the jerk meter 40 can be seen in FIG. 3. The jerk meter 40 includes a generally cup shaped iron member 66 having a magnet 68, with polarity as indicated secured to its inner wall and having an iron plug 70 connected to magnet 68. The magnet 68 and plug 70 generally define a circular leg centrally located in the cup 66. Plug 70 has a spindle portion 72 secured thereto to which there is secured a pair of diaphragm support springs 74. The support springs 74 support an annular shell 76 which is generally of a non-magnetic material which shell 76 extends at least partially coaxially relative to the iron plug 70. An output coil 78 is wound around the inner end of the shell 76 and a circular iron ring 80 is secured also to the shell 76. The jerk meter 40 is mounted such that the axis Y1 of the cup 66 and hence of the device itself is substantially horizontal and along the line of the longitudinal axis Y2 of the vehicle 10. Thus when the vehicle 10 is subject to deceleration, the coils 78 will be moved via the shell 76 against the support of the springs 74 which restrict the coil motion to substantially a straight line. At the same time the conducting ring 80 which acts as a seismic mass along with the mass of the other associated moving parts will also be moved. The flux from the magnet 68 will link the turns of the coil 78 and will produce a voltage therein which is a function of rate at which coil 78 is moved relative to the cup shaped member 66. The conducting ring 80 represents a low reluctance path and will generally provide a uniform field for coil 78 as it moves. The output voltage of the coil 78 will have a magnitude indicative of the rate of change of acceleration or deceleration; this can be seen from the following equations defining the device 40:

(1)
$$d = \frac{\frac{m}{k}\ddot{Y}}{\frac{m}{k}S^2 + \frac{m}{k}S + 1}$$

where
(1) $m$ = seismic mass
(2) $k$ = spring rate
(3) $d$ = relative displacement of mass
(4) $D$ = damping coefficient
(5) $S$ = Laplace variable
(6) $\ddot{Y}$ = vehicle acceleration
(7) $L$ = length of wire in coil
(8) $B$ = flux density The output voltage in the coil 78 is:

(2) $$e = BLd \times 10^{-8}$$

Differentiating (1) and substituting in (2)

(3) $$e = \frac{BL\frac{m}{k} \times 10^{-8} \frac{d}{dt}(\ddot{Y})}{\frac{m}{k}S^2 + \frac{D}{k}S + 1} = \frac{BL\frac{m}{k} \times 10^{-8}\dddot{Y}}{\frac{m}{k}S^2 + \frac{D}{k}S + 1}$$

$\dddot{Y}$ is the "jerk" or rate of change of acceleration or deceleration and hence the magnitude of $e$ is proportional to the magnitude of $\dddot{Y}$.

While it will be apparent that the referred embodiment of the invention disclosed is well calculated to fulfill the objects above stated, it will be appreciated that the invention is susceptible to modification, variation and change without departing from the proper scope or fair meaning of the invention.

What is claimed is:

1. A skid control system for controlling the fluid pressure to the brakes of at least one wheel of a wheeled vehicle comprising: first means for providing a first indication of the rate of change of acceleration of the vehicle during a skid condition, modulating means for modulating the fluid pressure in accordance with the polarity of said first indication whereby vehicle deceleration is maximized.

2. A skid control system for controlling the fluid pressure to the brakes of at least one wheel of a wheeled vehicle comprising: first means for providing a first indication of the rate of change of acceleration of the vehicle during a skid condition, second means for providing a second indication of the rate of change of fluid pressure, said modulating means modulating the fluid pressure in accordance with the relative polarities of said first and second indications, whereby vehicle deceleration is maximized.

3. A skid control system for controlling the fluid pressure to the brakes of at least one wheel of a wheeled vehicle comprising: first means for providing a first indication of the polarity of the rate of change of acceleration of the vehicle during a skid condition, second means for providing a second indication of the polarity of the rate of change of fluid pressure, modulating means modulating the fluid pressure in accordance with the relative polarities of said first and second indications by decreasing fluid pressure when said relative polarities are of a first condition and for increasing fluid pressure when said relative polarities are of a second condition whereby vehicle deceleration is maximized.

4. The system of claim 3 with said first means comprising a jerk meter.

5. The system of claim 3 further comprising third means for sensing the deceleration rate of the wheel and for disabling said modulating means unless the magnitude of the wheel deceleration attains a preselected magnitude.

6. The system of claim 5 with said first means comprising a jerk meter.

References Cited

UNITED STATES PATENTS

| | | | |
|---|---|---|---|
| 3,362,757 | 1/1968 | Marcheron | 303—21 A4 |
| 3,433,536 | 3/1969 | Skinner | 188—181 X |
| 3,469,662 | 9/1969 | Dewar | 303—21 A4 |
| 3,515,440 | 6/1970 | Every et al. | 181—181 X |
| 3,547,500 | 12/1970 | Riordan | 303—21 P |

MILTON BUCHLER, Primary Examiner

S. G. KUNIN, Assistant Examiner

U.S. Cl. X.R.

303—20